(12) United States Patent
Williams et al.

(10) Patent No.: US 8,755,981 B2
(45) Date of Patent: Jun. 17, 2014

(54) REAL TIME COMPENSATION OF CHANGING FRICTION CHARACTERISTICS OF A CLUTCH IN A TRANSMISSION

(75) Inventors: Robert L. Williams, Holly, MI (US); Steven P. Moorman, Dexter, MI (US); Matthew D. Whitton, Howell, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 191 days.

(21) Appl. No.: 13/490,636

(22) Filed: Jun. 7, 2012

(65) Prior Publication Data

US 2013/0332038 A1 Dec. 12, 2013

(51) Int. Cl.
*G06F 7/00* (2006.01)
*G06F 17/00* (2006.01)
*G06F 19/00* (2011.01)

(52) U.S. Cl.
USPC ............... 701/58; 701/51; 701/60; 701/67; 700/28; 700/44

(58) Field of Classification Search
CPC ........ B60W 10/02; B60W 2510/0258; B60W 2510/0241; B60W 2510/0657; B60W 2510/0275; B60W 2510/0283; B60W 2510/0695; B60W 2550/148; B60W 2710/083; B60W 50/06; F16H 2057/014; F16H 2059/465
USPC .......... 701/51, 58, 60, 65, 67, 68; 700/28, 40, 700/44, 47
See application file for complete search history.

(56) References Cited

U.S. PATENT DOCUMENTS

2010/0108420 A1* 5/2010 Keiji .................... 180/65.275

* cited by examiner

*Primary Examiner* — Rami Khatib
(74) *Attorney, Agent, or Firm* — Quinn Law Group, PLLC

(57) ABSTRACT

A method of controlling a transmission includes estimating an expected coefficient of friction of the clutch, estimating a value of an expected torque required to maintain a constant slip of the clutch for a current input torque applied to the transmission, and determining a value of an actual torque applied to the clutch to maintain the constant slip of the clutch at the current input torque. An actual coefficient of friction of the clutch is calculated by dividing the actual torque applied to the clutch by the expected torque applied to the clutch, and multiplying that quotient by the expected coefficient of friction of the clutch. A feed forward torque command is then adjusted based upon the actual coefficient of friction of the clutch to define a revised value of the feed forward torque command, which may then be used to control the clutch for various control operations.

18 Claims, 2 Drawing Sheets

REAL TIME COMPENSATION OF CHANGING FRICTION CHARACTERISTICS OF A CLUTCH IN A TRANSMISSION

TECHNICAL FIELD

The invention generally relates to a method of controlling a transmission, and more specifically to a method of compensating for changing friction characteristics of a clutch of the transmission in real time.

BACKGROUND

Automatic transmissions include one or more clutches for performing various functions. The clutch may include either a dry clutch or a wet clutch, and uses friction to rotatably couple two different elements, such as for example rotatably coupling an input shaft to an output shaft. The performance of the clutch is dependent upon a coefficient of friction of the clutch. Control of the clutch is often based on an operating model of the transmission. The operating model uses an estimated or predicted coefficient of friction of the clutch to predict how the clutch will respond, and therefore how to control the clutch. However, the coefficient of friction of the clutch, particularly in dry clutches, may change over time from factors including but not limited to the energy absorbed by the clutch or the starting temperature of the clutch. When the coefficient of friction of the clutch changes and deviates from the estimated or predicted coefficient of friction of the clutch used by the model, the output control signal of the model may not accurately reflect the response of the clutch, thereby affecting the performance of the clutch and the transmission.

SUMMARY

A method of controlling an automatic transmission having a clutch is provided. The method includes estimating an expected coefficient of friction of the clutch, and estimating a value of an expected torque required to maintain a constant target low level of slip of the clutch, i.e., micro-slip, for a current input torque applied to the transmission. A value of an actual torque applied to the clutch to maintain the constant slip of the clutch at the current input torque is determined. An actual coefficient of friction of the clutch is then calculated. The actual coefficient of friction of the clutch is calculated from the equation:

$$\mu_{act} = \left(\frac{\tau_{act}}{\tau_{exp}}\right)\mu_{exp};$$

wherein $\mu_{act}$ is the actual coefficient of friction of the clutch, $\mu_{exp}$ is the expected coefficient of friction of the clutch, $\tau_{act}$ is the value of the actual torque applied to the clutch to maintain the constant slip of the clutch, and $\tau_{exp}$ is the value of the expected torque required to maintain the constant slip of the clutch. An initial value of a feed forward torque command that is applied to the clutch is adjusted based on the calculated actual coefficient of friction of the clutch, to define a revised value of the feed forward torque command.

A method of controlling a dry clutch of a transmission is also provided. The method includes providing a control module operable to control the operation of the transmission. The control module is configured for determining if a current input torque that is being applied to the transmission includes a steady value or a varying value. Estimating an expected coefficient of friction of the clutch, and estimating a value of an expected torque required to maintain a constant slip of the clutch for a current input torque applied to the transmission. A value of an actual torque applied to the clutch to maintain the constant slip of the clutch at the current input torque is determined. When the input torque being applied to the transmission includes a steady value, an actual coefficient of friction of the clutch is then calculated. The actual coefficient of friction of the clutch is calculated from the equation:

$$\mu_{act} = \left(\frac{\tau_{act}}{\tau_{exp}}\right)\mu_{exp};$$

wherein $\mu_{act}$ is the actual coefficient of friction of the clutch, $\mu_{exp}$ is the expected coefficient of friction of the clutch, $\tau_{act}$ is the value of the actual torque applied to the clutch to maintain the constant slip of the clutch, and $\tau_{exp}$ is the value of the expected torque required to maintain the constant slip of the clutch. An initial value of a feed forward torque command that is applied to the clutch is adjusted based on the calculated actual coefficient of friction of the clutch, to define a revised value of the feed forward torque command. The revised value of the feed forward torque command is applied to a control operation.

Accordingly, the actual or current coefficient of friction of the clutch may be calculated in real time, and used to adjust the feed forward torque command, which is the control signal that is applied to the clutch to control the clutch during one or more control operations. Accordingly, the feed forward torque command reflects the actual or current coefficient of friction of the clutch, thereby improving the operation of the transmission.

The above features and advantages and other features and advantages of the present invention are readily apparent from the following detailed description of the best modes for carrying out the invention when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the invention, as defined by the appended claims.

Referring to the Figures, wherein like numerals indicate like parts throughout the several views, a method of controlling a transmission of a vehicle is provided. The transmission includes an automatic transmission having at least one clutch. The clutch may include but is not limited to a dry clutch or a wet clutch. The clutch selectively couples at least two different transmission components for rotation together. For example, the clutch may selectively couple an input shaft of the transmission to a lay shaft or an output shaft of the transmission. The input shaft receives an input torque from a power source, such as an engine, and the output shaft may direct the torque to a gear set or a drive wheel. When engaged, the clutch rotatably couples the input shaft to the output shaft. When disengaged, the clutch disconnects the input shaft from the output shaft, thereby preventing torque transfer therebetween. For the purpose of the following description, reference is made to an exemplary transmission having an input shaft connected to an input side of a clutch, and an output shaft connected to an output side of the clutch.

Figure 1:
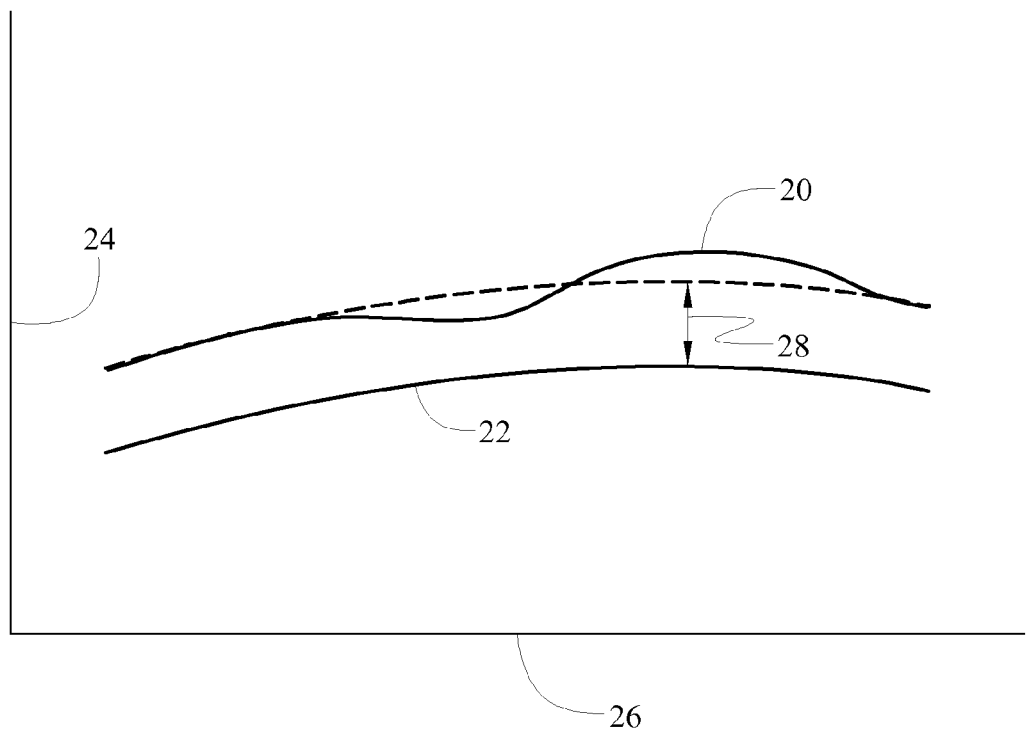
FIG. 1 is a graph showing the relationship between the speed of an input side of a clutch and the speed of an output side of the clutch of a transmission, and the relative slip therebetween.

Referring to FIG. 1, a relationship between an input speed 20, i.e., a rotational speed of the input shaft, and an output speed 22, i.e., a rotational speed of the output shaft is shown. A vertical axis 24 of FIG. 1 represents rotational speed, while a horizontal axis 26 of FIG. 1 represents time. The clutch is intentionally allowed to slip when engaged, i.e., the clutch allows a slight relative rotational difference between the input shaft and the output shaft. Accordingly, as shown in FIG. 1, at any instance in time, the input speed 20 is maintained at a slightly higher level than the output speed 22. Preferably, the clutch slip (i.e., the difference between the input speed 20 and the output speed 22) is maintained at a target slip 28, which is preferably between the range of 5-10 rpm, i.e., micro-slip levels. Controlling clutch slip to this critical level allows for quicker, more precise control of the clutch during control operations, such as but not limited to a transmission up-shift or a transmission down-shift. Additionally, controlling the clutch slip to this critical level allows the control system to learn the clutch characteristics and adapt the clutch control as the clutch characteristics change over time.

Figure 2:
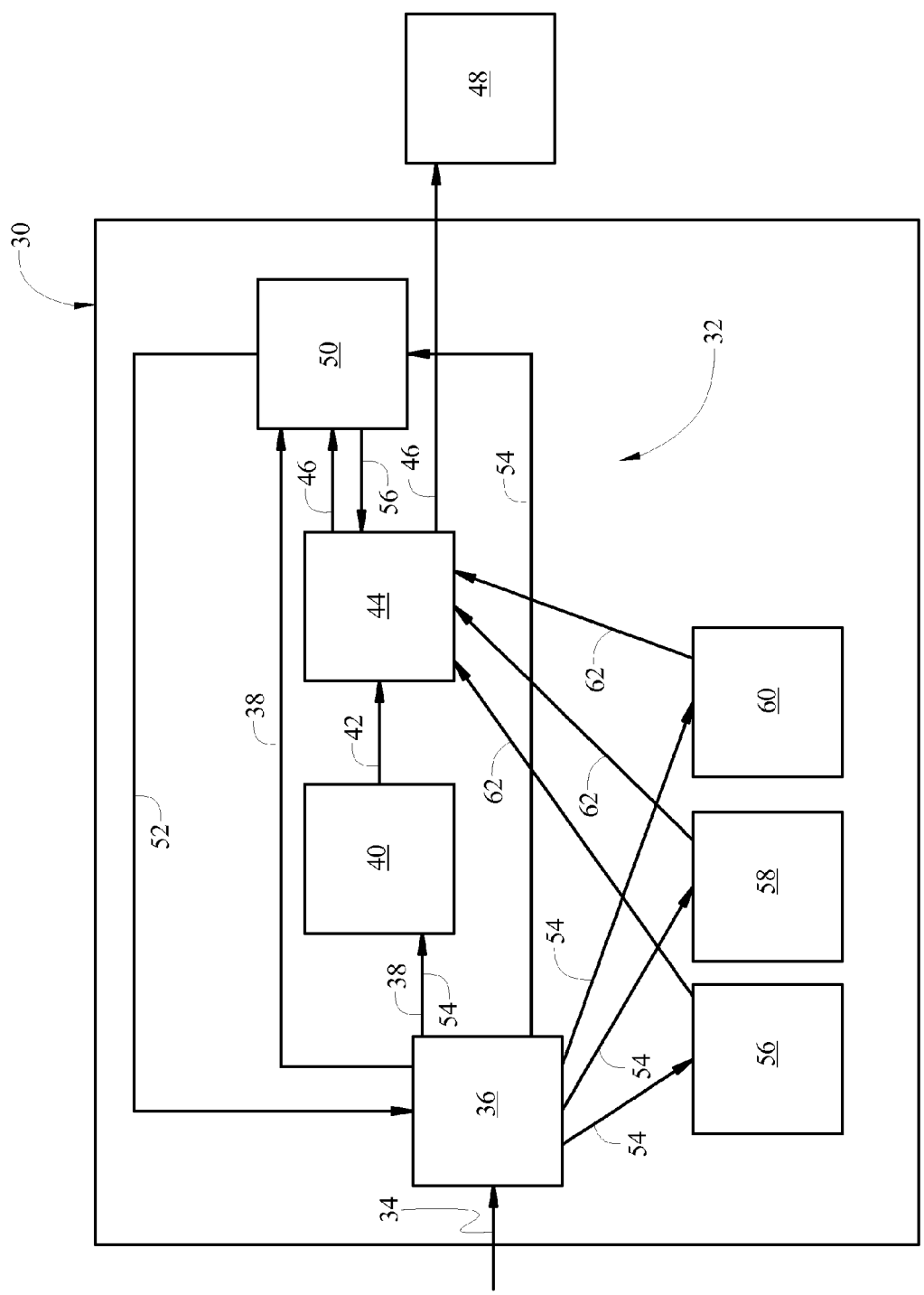
FIG. 2 is a schematic flowchart showing a control strategy for controlling the transmission.

Referring to FIG. 2, the transmission may include a control module 30, such as but not limited to a transmission control unit, to control the operation of the transmission, including the torque applied to the clutch, transmission up-shifts, transmission down-shifts, and clutch slip control. The control module 30 may include a computer and/or processor, and include all software, hardware, memory, algorithms, connections, sensors, etc., necessary to manage and control the operation of the transmission. As such, a method may be embodied as a program operable on the control module 30. It should be appreciated that the control module 30 may include any device capable of analyzing data from the various sensors, comparing data, making the necessary decisions required to control the operation of the transmission, and executing the required tasks necessary to control the operation of the transmission.

The control module 30 controls the clutch to control the amount of torque the clutch applies. For example, during steady state operation when the input torque 34 remains constant, the control module 30 controls the clutch so that the clutch applies a torque sufficient to allow the target slip 28. The control module 30 may use a model that simulates the operation of the transmission to estimate the amount of torque that the clutch must apply to achieve the target slip 28. In so doing, the model may assume an expected coefficient of friction of the clutch. However, the coefficient of friction of the clutch may change over time due to usage, temperature, etc. Accordingly, the control module 30 includes an algorithm that embodies a method for correcting for a change in the coefficient of friction of the clutch in real time during a drive cycle.

Referring to FIG. 2, the method for correcting for a change in the coefficient of friction of the clutch is generally shown at 32. The control module 30 receives and monitors the input torque 34 to determine if the input torque 34 includes a steady value, or includes a varying value. As used herein, a steady value includes a value of torque that does not vary more than a pre-defined range within a pre-defined time period. For example, a steady value may be defined as, but is not limited to, a torque value that does not vary more than +/−5 Nm within a 5 second time period. If the transmission is operating in a steady state condition, then the input torque 34 will remain constant, and the method may be implemented as described below. A torque command calculation module 36 calculates an initial value of a feed forward torque command based upon the input torque 34. The initial value of the feed forward torque command 38 is generally shown at 38. The feed forward torque command 38 is the expected clutch torque required to perform the clutch action based on the expected input torque 34. Under steady state conditions, the feed forward torque command 38 is the expected clutch torque required to stably maintain the desired micro-slip levels. The torque command calculation module 36 passes the initial value of the feed forward torque command 38 to a slip control module 40, which adjusts the initial value of the feed forward torque command 38 to achieve the target slip 28 between the input speed 20 and the output speed 22. After being adjusted for slip, the feed forward torque command 38 may be referred to as the proportional closed-loop corrected torque command 42. The proportional closed-loop corrected torque command 42 is then passed to an integral summation and torque selection module 44, which provides any necessary integral closed-loop correction factors to the proportional closed-loop corrected torque command 42 to define a total clutch torque command 46, which is then passed to a clutch controller 48. The clutch controller 48 applies the total clutch torque command 46 to the clutch. The total clutch torque command 46 is simultaneously passed from the integral summation and torque selection module 44 to a friction correction module 50. The friction correction module 50 also receives the initial value of the feed forward torque command 38 from the torque command calculation module 36.

The friction correction module 50 receives a value for an expected torque required to maintain the target slip 28 for the current input torque 34, receives a value of an actual torque applied to the clutch to maintain the target slip 28, and may estimate an expected coefficient of friction of the clutch. The friction correction module 50 uses these values to calculate a torque correction factor 52, which is passed back to the torque command calculation module 36. Additionally, the friction correction module 50 determines the proper conditions when a valid sample of torque correction factors 52 may be calculated, a number of validation criteria, torque stability, and correction factor stability.

The torque command calculation module 36 factors the torque correction factor 52 into the calculation of the initial value of the feed forward torque command 38 to define a revised value of the feed forward torque command 54. The revised value of the feed forward torque command 54 is then passed to the slip control module 40, and then on to the integral summation and torque selection module 44 as described above. When the feed forward torque command 38 is adjusted to provide the updated revised value of the feed forward torque command 54, the integral summation and torque selection module 44 adjusts the integral closed-loop correction 42 to offset a difference between the initial feed forward torque command 38 and the revised feed forward torque command 54 so that the total clutch torque command 46 remains unchanged to prevent a step disturbance in clutch torque due to the feed forward torque update.

The torque command calculation module 36 also passes the revised value of the feed forward torque command 54 to various control modules 30, such as but not limited to a shift control module 56, a launch control module 58 or a creep control module 60. The various control modules 30 use the revised value of the feed forward torque command 54 to define the appropriate clutch control signal 62 for performing their respective tasks, and send their respective clutch control signals 62 to the integral summation and torque selection module 44. Upon the required performance of one of the control operations, such as but not limited to a transmission up-shift or a vehicle launch, the integral summation and torque selection module 44 may provide the appropriate clutch control signal 62 to the clutch controller 48. In so doing, the clutch control signal 62 includes the revised value of the feed forward torque command 54, which incorporates the actual or current coefficient of friction value therein, so as to provide precise and accurate control of the clutch.

The torque command calculation module 36 also passes the revised value of the feed forward torque command 54 directly to the friction correction module 50. The friction correction module 50 uses the revised value of the feed forward torque command 54 to determine the delta torque in the revised value of the feed forward torque command 54 that occurs when the value is updated, in order to determine how much to adjust an integral closed-loop correction update amount 56 which is sent to the integral summation and torque selection module 44 to ensure that the overall total clutch torque does not have a step change due to the update and disturb the clutch system.

The method of controlling the operation of the transmission includes providing the control module 30 operable to control the operation of the transmission. As noted above, the control module 30 includes all software, hardware, memory, algorithms, connections, sensors, etc. necessary to manage and control the operation of the transmission. The control module 30 is configured to perform the various tasks of the method described below.

The current input torque 34 being applied to the transmission is estimated. The current input torque 34 may be estimated from the model simulating the operation of the transmission. As such, the model may use various inputs, such as the rotational speed of the engine, manifold air-flow, ignition timing, etc., to estimate the current input torque 34. The control module 30 monitors the current input torque 34 to determining if the current input torque 34 being applied to the transmission includes a steady value or a varying value. As noted above, a steady value of the input torque 34 indicates that the transmission is operating in a steady state condition, with a steady clutch slip.

When the transmission is operating in the steady state condition, i.e., the input torque 34 is steady, then the ratio of the actual coefficient of friction of the clutch to the expected coefficient of friction of the clutch is equal to the ratio of the value of the actual torque required to maintain the target slip 28 of the clutch to the value of the expected torque required to maintain the target slip 28 of the clutch. This relationship is expressed in Equation 1 as follows:

$$\frac{\tau_{act}}{\tau_{exp}} = \frac{\mu_{act}}{\mu_{exp}} \qquad 1)$$

wherein $\mu_{act}$ is the actual coefficient of friction of the clutch, $\mu_{exp}$ is the expected coefficient of friction of the clutch, $\tau_{act}$ is the value of the actual torque applied to the clutch to maintain the constant slip of the clutch, and $\tau_{exp}$ is the value of the expected torque required to maintain the constant slip of the clutch.

The basic clutch torque equation is expressed in Equation 2 as follows:

$$\tau = F\mu R_m N \qquad 2)$$

wherein $\tau$ is the clutch torque, F is the clutch apply force, $\mu$ is the clutch coefficient of friction; $R_m$ is the clutch mean radius ($R_m$ is constant for a clutch in a given shift), and N is the number of clutch apply surfaces (N is constant for a given clutch). The basic clutch torque equation, i.e., Equation 2, may be solved for the clutch apply force, which is given by Equation 3 as follows;

$$F = \frac{\tau}{\mu R_m N} \qquad 3)$$

Since the mean radius Rm and the number of clutch apply surfaces N are constant for a given clutch, when the clutch is operating at different coefficients of friction, different clutch torques are required to obtain a given clutch apply force.

Therefore, the expected feed forward torque is given by Equation 4 as follows:

$$\tau_{exp} = F\mu_{exp} R_m N \qquad 4)$$

and the actual feed forward torque is given by Equation 5 as follows:

$$\tau_{act} = F\mu_{act} R_m N \qquad 5)$$

Solving Equation 4 for the clutch apply force F provides Equation 6:

$$F = \frac{\tau_{exp}}{\mu_{exp} R_m N}. \qquad 6)$$

By substituting Equation 6 for the clutch apply force into Equation 5, shown as Equation 7, Equation 1 may be derived therefrom.

$$\tau_{act} = \left(\frac{\tau_{exp}}{\mu_{exp} R_m N}\right)\mu_{act} R_m N \qquad 7)$$

This ratio of Coefficients of Friction is referred to as the Mu Factor (MuFx) and can be determined from the ratio of torque necessary to maintain micro-slip control, as expressed in Equation 8 as follows:

$$MuFx = \frac{\tau_{act}}{\tau_{exp}} = \frac{\mu_{act}}{\mu_{exp}}. \qquad 8)$$

Accordingly, the method further includes estimating the expected coefficient of friction of the clutch, estimating the value of the expected torque required to maintain the target slip 28 of the clutch, and determining the value of the actual torque applied to the clutch to maintain the constant slip of the clutch at the current input torque 34. These values may be estimated and/or determined in any suitable manner. For example, the expected coefficient of friction of the clutch may be a defined value stored in memory. The value of the expected force required to maintain the target slip 28 may be estimated from the model simulating the operation of the transmission for the given input torque 34. The value of the actual torque applied to the clutch to maintain the constant slip of the clutch may be determined by using proportional-integral closed-loop control to establish stable micro-slip control under steady input torque conditions.

Once the above noted values are estimated and/or determined, then the control module 30 may calculate the actual coefficient of friction of the clutch. The actual coefficient of friction may be calculated from Equation 9:

$$\mu_{act} = \left(\frac{\tau_{act}}{\tau_{exp}}\right)\mu_{exp} \qquad 9)$$

Once the actual coefficient of friction of the clutch is calculated, then the initial value of the feed forward torque command 38 is adjusted based on the calculated actual coefficient of friction of the clutch. The initial value of the feed forward command is adjusted to define the revised value of the feed forward torque command 54. Adjusting the initial value of the feed forward torque command 38 may include calculating the torque correction factor 52. The torque correction factor 52 is equal to the ratio of the actual coefficient of friction of the clutch divided by the expected coefficient of friction of the clutch, and is expressed as Equation 10:

$$MuFx = \frac{\mu_{act}}{\mu_{exp}} \qquad 10)$$

Wherein MuFx is the torque correction factor 52, $\mu_{act}$ is the actual coefficient of friction of the clutch, and $\mu_{exp}$ is the expected coefficient of friction of the clutch. The initial value of the feed forward torque command 38 is multiplied by the torque correction factor 52 to define the revised value of the feed forward torque command 54. Accordingly, if the ratio of the actual coefficient of friction of the clutch to the expected coefficient of friction of the clutch is equal to 1, then the torque correction factor 52 is also equal to 1, and the revised value of the feed forward torque command 54 will remain unchanged and equal to the initial value of the feed forward torque command 38. However, if the ratio of the actual coefficient of friction of the clutch to the expected coefficient of friction of the clutch is equal to 0.9, then the torque correction factor 52 is also equal to 0.9, and the revised value of the feed forward torque command 54 is equal to 90% of the initial value of the feed forward torque command 38.

Alternatively, instead of using an expected coefficient of friction value and calculating an actual coefficient of friction number, the control system may operate with the coefficient of friction value lumped into an overall clutch gain, given by equation 11 as follows:

$$K = \mu R_m N \qquad 11)$$

Wherein K is the clutch gain. The expected clutch gain $K_{exp}$ is given by equation 12, and the actual clutch gain $K_{act}$ is given by equation 13.

$$K_{exp} = \mu_{exp} R_m N \qquad 12)$$

$$K_{act} = \mu_{act} R_m N \qquad 13)$$

Under this system, the actual value of the coefficient of friction is not critical, but the ratio of the values are in the form of a multiplier, the MuFx value, which is calculated directly from the ratios of torque required to maintain micro-slip, i.e., the actual total clutch torque required to maintain micro slip and the expected feed forward clutch torque to maintain micro slip, i.e., $$MuFx = \frac{\tau_{act}}{\tau_{exp}}.$$

The control module 30 may then apply the revised value of the feed forward torque command 54 to a control operation. In so doing, the revised value of the feed forward torque command 54 uses the actual coefficient of friction for the clutch, and not the expected coefficient of friction, thereby improving performance of the transmission. As noted above, the control operation may include but is not limited to a transmission up-shift, a transmission down-shift, a vehicle launch, or transmission clutch slip control. The control module 30 continuously calculates the actual coefficient of friction of the clutch, and continuously adjusts the revised value of the feed forward torque command 54 to account for continuous changes in the actual coefficient of friction of the clutch. Accordingly, the method described above is an ongoing real time control that corrects for the changing coefficient of friction of the clutch.

In order to avoid a spike in the total applied torque that is applied to the clutch during slip control when the revised value of the feed forward torque command is updated, the delta torque value that the revised feed forward torque command 54 steps due to the MuFx factor adjustment must be counteracted such that the total clutch torque command does not step abruptly. Accordingly, a numerical difference between the updated revised value of the feed forward torque command 54 and the previous revised value of the feed forward torque command 54 is calculated. The numerical difference is defined as the delta torque. The integral closed-loop correction value is adjusted to offset the delta torque so that the actual value of the total clutch torque command 46 that is applied to the clutch is not affected by adjusting the feed forward torque command 38 to the updated revised value of the feed forward torque command 54. For example, if the delta torque includes a positive 20 Nm change, then the integral closed-loop correction value is adjusted by negative 20 Nm to offset the change from the previous to the updated revised value of the feed forward torque command 54. As the input torque changes to new levels and the adjusted level of the integral closed-loop correction value is no longer appropriate, this counteracted offset may be slowly learned out over time in a smooth manner.

The MuFx adjustment of the feed forward torque command 38 can be coupled with an adaptive adjustment of the clutch characteristics, such that when a sufficient amount of MuFx is detected, the clutch characteristics can be adjusted under specific conditions based on the MuFx, if it is expected that the MuFx deviation from 1 is due to: error in the expected coefficient of friction, error in the expected clutch characteristics, clutch wear, etc. Any adjustments of the clutch characteristics would be expected to help bring the torque correction factor 52 (MuFx) back towards 1, i.e., bring the adapt corrected value of the feed forward torque command 38 closer to the Mufx corrected value of feed forward torque command.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A method of controlling an automatic transmission having a clutch, the method comprising:
providing a control module operable to control the operation of the transmission, wherein the control module is configured for:
estimating an expected coefficient of friction of the clutch;
estimating a value of an expected torque required to maintain a constant slip of the clutch for a current input torque applied to the transmission;
determining a value of an actual torque applied to the clutch to maintain the constant slip of the clutch at the current input torque;
calculating an actual coefficient of friction of the clutch, wherein the actual coefficient of friction of the clutch is calculated from the equation:

$$\mu_{act} = \left(\frac{\tau_{act}}{\tau_{exp}}\right)\mu_{exp}$$

wherein $\mu_{act}$ is the actual coefficient of friction of the clutch, $\mu_{exp}$ is the expected coefficient of friction of the clutch, $\tau_{act}$ is the value of the actual torque applied to the clutch to maintain the constant slip of the clutch, and $\tau_{exp}$ is the value of the expected torque required to maintain the constant slip of the clutch; and
adjusting an initial value of a feed forward torque command applied to the clutch based on the calculated actual coefficient of friction of the clutch to define a revised value of the feed forward torque command.

2. The method as set forth in claim 1 further comprising estimating a current input torque being applied to the transmission.

3. The method as set forth in claim 2 further comprising determining if the current input torque being applied to the transmission includes a steady value or a varying value.

4. The method as set forth in claim 3 wherein calculating the actual coefficient of friction of the clutch is further defined as calculating the actual coefficient of friction when the current input torque being applied to the transmission includes a steady value.

5. The method as set forth in claim 1 wherein adjusting the initial value of the feed forward torque command includes calculating a torque correction factor, wherein the torque correction factor is equal to the ratio of the actual coefficient of friction of the clutch divided by the expected coefficient of friction of the clutch.

6. The method as set forth in claim 5 wherein adjusting the initial value of the feed forward torque command includes multiplying the initial value of the feed forward torque command by the torque correction factor to define the revised value of the feed forward torque command.

7. The method as set forth in claim 1 further comprising calculating a numerical difference between the revised value of the feed forward torque command and the initial value of the feed forward torque command to define a delta torque.

8. The method as set forth in claim 7 further comprising adjusting the revised value of the feed forward torque command to offset the delta torque so that the actual value of the torque applied to the clutch is not affected by adjusting the initial value of the feed forward torque command to the revised value of the feed forward torque command.

9. The method as set forth in claim 1 further comprising continuously calculating the actual coefficient of friction of the clutch, and continuously adjusting the revised value of the feed forward torque command to account for continuous changes in the actual coefficient of friction of the clutch.

10. The method as set forth in claim 1 further comprising applying the revised value of the feed forward torque command to a control operation.

11. The method as set forth in claim 10 wherein the control operation includes at least one of a transmission up-shift, a transmission down-shift, a vehicle launch, or transmission clutch slip control.

12. The method as set forth in claim 1 wherein the clutch includes a dry clutch.

13. A method of controlling a dry clutch of a transmission, the method comprising:
providing a control module operable to control the operation of the transmission, wherein the control module is configured for:
determining if a current input torque being applied to the transmission includes a steady value or a varying value;
estimating an expected coefficient of friction of the clutch;
estimating a value of an expected torque required to maintain a constant slip of the clutch for a current input torque applied to the transmission;
determining a value of an actual torque applied to the clutch to maintain the constant slip of the clutch at the current input torque;
calculating an actual coefficient of friction of the clutch when the input torque being applied to the transmission includes a steady value, wherein the actual coefficient of friction of the clutch is calculated from the equation:

$$\mu_{act} = \left(\frac{\tau_{act}}{\tau_{exp}}\right)\mu_{exp}$$

wherein $\mu_{act}$ is the actual coefficient of friction of the clutch, $\mu_{exp}$ is the expected coefficient of friction of the clutch, $\tau_{act}$ is the value of the actual torque applied to the clutch to maintain the constant slip of the clutch, and $\tau_{exp}$ is the value of the expected torque required to maintain the constant slip of the clutch;
adjusting an initial value of a feed forward torque command applied to the clutch based on the calculated actual coefficient of friction of the clutch to define a revised value of the feed forward torque command; and
applying the revised value of the feed forward torque command to a control operation.

14. The method as set forth in claim 13 wherein adjusting the initial value of the feed forward torque command includes calculating a torque correction factor, wherein the torque correction factor is equal to the ratio of the actual coefficient of friction of the clutch divided by the expected coefficient of friction of the clutch.

15. The method as set forth in claim 14 wherein adjusting the initial value of the feed forward torque command includes multiplying the initial value of the feed forward torque command by the torque correction factor to define the revised value of the feed forward torque command.

16. The method as set forth in claim 13 further comprising calculating a numerical difference between the revised value of the feed forward torque command and the initial value of the feed forward torque command to define a delta torque.

17. The method as set forth in claim 16 further comprising adjusting the revised value of the feed forward torque command to offset the delta torque so that the actual value of the torque applied to the clutch is not affected by adjusting the initial value of the feed forward torque command to the revised value of the feed forward torque command.

18. The method as set forth in claim 13 further comprising continuously calculating the actual coefficient of friction of the clutch, and continuously adjusting the revised value of the feed forward torque command to account for continuous changes in the actual coefficient of friction of the clutch.

\* \* \* \* \*